United States Patent
Qian et al.

(10) Patent No.: US 12,081,149 B2
(45) Date of Patent: Sep. 3, 2024

(54) MULTI-MOVER DIRECT DRIVE TRANSMISSION SYSTEM, RELATED CONTROL METHOD, COMPUTER DEVICE, AND STORAGE MEDIUM

(71) Applicant: AAC Microtech (Changzhou) Co., Ltd., Changzhou (CN)

(72) Inventors: Lin Qian, Shenzhen (CN); Yu Qin, Shenzhen (CN); Min Chen, Shenzhen (CN); Weiling Shi, Shenzhen (CN); Shun Guo, Shenzhen (CN); Xueyuan Zhu, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 0 days.

(21) Appl. No.: 17/918,552

(22) PCT Filed: Jul. 28, 2022

(86) PCT No.: PCT/CN2022/108453
§ 371 (c)(1),
(2) Date: Oct. 12, 2022

(87) PCT Pub. No.: WO2024/000714
PCT Pub. Date: Jan. 4, 2024

(65) Prior Publication Data
US 2024/0213900 A1  Jun. 27, 2024

(30) Foreign Application Priority Data
Jun. 30, 2022 (CN) .......................... 202210779127.2

(51) Int. Cl.
*H01F 7/02* (2006.01)
*B65G 54/02* (2006.01)
(Continued)

(52) U.S. Cl.
CPC .............. *H02P 23/14* (2013.01); *B65G 54/02* (2013.01); *H02K 11/215* (2016.01); *H02P 25/06* (2013.01);
(Continued)

(58) Field of Classification Search
CPC ........ H02P 23/14; H02P 25/06; H02K 11/215
See application file for complete search history.

(56) References Cited

U.S. PATENT DOCUMENTS

2022/0057628 A1* 2/2022 Smolka .............. H02K 41/0356

* cited by examiner

*Primary Examiner* — Muhammad S Islam
(74) *Attorney, Agent, or Firm* — W&G Law Group

(57) ABSTRACT

A multi-mover direct drive transmission system, including: stator unit formed by stator segments and includes frame and coil windings; mover units movable relative to the stator unit and each includes mover slidably connected to the stator unit and movable relative to the frame, and magnet fixed to the mover; and actuators. The magnet is arranged opposite to and spaced from the coil winding, and the coil winding drives the magnet to drive the mover. The frame includes feedback segments and transition segments. The stator unit further includes hall elements. The hall element outputs a hall signal according to a magnetic field variation detected. The actuator calculates an electrical angle and calculates a drive current, the coil winding drives the magnet to move to realize position correction. The multi-mover direct drive transmission system has a simple structure, a small number of components, and is simple and easy-to-implement the motion control method.

8 Claims, 9 Drawing Sheets

(51) Int. Cl.
*H02K 11/215* (2016.01)
*H02P 23/14* (2006.01)
*H02P 25/06* (2016.01)

(52) U.S. Cl.
CPC ................ *B65G 2203/0283* (2013.01); *B65G 2203/043* (2013.01)

MULTI-MOVER DIRECT DRIVE TRANSMISSION SYSTEM, RELATED CONTROL METHOD, COMPUTER DEVICE, AND STORAGE MEDIUM

TECHNICAL FIELD

The present disclosure relates to the field of transmission system control technologies, and in particular, to a multi-mover direct drive transmission system, a method for controlling a multi-mover direct drive transmission system, a computer device, and a non-transitory storage medium.

BACKGROUND

With the more and more important application of flow operation in production lines, a multi-mover direct drive transmission system has become an important production device in the production lines.

The multi-mover direct drive transmission system in the related art includes a plurality of stators and a plurality of movers mounted on the stators. The stator includes a coil winding. The plurality of stators include linear segments and circular segments. The mover includes a magnet. The magnet is arranged directly opposite to and spaced from the coil winding. The coil winding drives the magnet to cause the mover to move. Structures of the coil windings in the plurality of stators in the multi-mover direct drive transmission system are classified into two types: linear segment windings and circular segment windings. In the multi-mover direct drive transmission system in the related art, displacement sensors are arranged in the linear segment and the circular segment to identify positions of the movers. The displacement sensor is generally realized by an encoder array.

However, in the related art, each of the stators requires an encoder array, leading to a complex structure, a difficult assembly process, and high costs. On some stators, only simple transition instead of positioning is required in the absence of stations, so an expensive encoder array is not required. How to control the stators on which only simple transition instead of positioning is required in the absence of stations is a technical problem to be solved.

Therefore, there is a need to provide a new multi-mover direct drive transmission system and a control method thereof to solve the above technical problem.

SUMMARY

An objective of the present disclosure is to provide a multi-mover direct drive transmission system, a method for controlling a multi-mover direct drive transmission system, a computer device, and a non-transitory storage medium that have a simple structure, a small number of components, and a simple and easy-to-implement motion control method, so as to overcome the above technical problem.

In order to achieve the above objective, in a first aspect, an embodiment of the present disclosure provides a multi-mover direct drive transmission system, including: a stator unit formed by stator segments successively connected to each other, the stator unit includes a frame and coil windings mounted on the frame and arranged sequentially along an extending direction of the frame; mover units movable relative to the stator unit, each of the mover units includes a mover slidably connected to the stator unit and movable relative to the frame, and a magnet fixed to the mover; and actuators. The magnet is arranged directly opposite to and spaced from the coil winding, and the coil winding drives the magnet to cause the mover to move. The frame includes alternatingly arranged feedback segments and transition segments. The stator unit further includes hall elements mounted on the transition segments and fixed at intervals to the frame, each of the actuators corresponds to multiple ones of the coil windings, each of the hall elements is arranged corresponding to one of the coil windings, and each of the actuators is electrically connected to the hall element and the coil winding; the hall element is spaced from the magnet; the hall element and the coil winding are located on a same side. A magnetic field variation is produced when the mover unit moves to a magnetic field range of one of the coil windings, and one of the hall elements within the magnetic field range outputs a hall signal according to a magnetic field variation detected; the actuator corresponding to the hall element calculates an electrical angle based on the received hall signal and calculates a drive current according to a preset initial velocity of the mover unit and the electrical angle, and one of the coil windings corresponding to the hall element drives the magnet according to the drive current to move to realize position correction.

As an improvement, a height between the hall element and the magnet is adjustable.

As an improvement, the frame includes a first frame, a support bending and extending from the first frame, and a second frame bending and extending from an end of the support away from the first frame; the first frame, the support, and the second frame jointly define a receiving space, the hall element and the coil winding are received in the receiving space, the hall element is located on a side of the second frame close to the support, and the coil winding is located on a side of the second frame away from the support; and the mover is partially received in the receiving space, and the mover is connected to the second frame and slidably connected to the second frame.

As an improvement, the stator unit further includes a track fixed to the first frame, the track being received in the receiving space; and the mover further includes a mover body and a pulley fixed to the mover body, the pulley and the magnet are located at two opposite sides of the mover body respectively, and the pulley matches the track and is slidably connected to the track.

In a second aspect, an embodiment of the present disclosure further provides a method for controlling a multi-mover direct drive transmission system, applied to the multi-mover direct drive transmission system according to embodiments of the present disclosure, the stator unit further includes displacement sensors mounted on the feedback segments, and each of the displacement sensors is arranged corresponding to one of the stator units. The method includes the following steps: S1: detecting, in real time by the displacement sensor, a real-time position of the mover unit moving in the feedback segment; S2: determining, in real time according to a feedback position of the displacement sensor of the feedback segment, whether the mover unit enters a region of junction between the feedback segment and the transition segment; if yes, setting a current velocity of the mover unit as the initial velocity, generating, by the hall element, the hall signal by real-time detection, calculating, by the actuator, the electrical angle based on the received hall signal, and calculating a drive current according to the initial velocity and the electrical angle, driving, by one of the coil windings corresponding to the hall element, the magnet according to the drive current to move to realize position correction, and setting a master control mode of the coil winding; S3: detecting, in real time, a real-time position of the mover unit moving in the transition segment, and setting a cooperative control mode of each of the coil windings in a range of the transition segment according to the real-time position of the mover unit; the cooperative control mode is either of a master control mode and switch of a master-slave control mode; and S4: determining in real time whether the mover unit enters the region of junction between the transition segment and the feedback segment; if yes, stopping the control over each of the coil windings in the range of the transition segment, and setting the cooperative control mode of each of the coil windings in a range of the feedback segment, so as to realize transition from the transition segment to the feedback segment.

As an improvement, in S3, in a region of junction between two adjacent stator units in the transition segment, the setting the cooperative control mode includes: S31: generating, by a first hall element of the transition segment, the hall signal according to a magnetic field variation detected, calculating, by the actuator, the electrical angle based on the received hall signal, and determining according to the calculated electrical angle whether a first set value is reached, if no, returning to S2; and if yes, setting the master-slave control mode of two adjacent coil windings; and S32: determining, by a subsequent actuator according to the electrical angle calculated by the hall element connected thereto, whether a second set value is reached, if no, returning to S31; and if yes, setting the master control mode of a subsequent coil winding.

As an improvement, in step S4, along a motion direction of the mover unit, the control over the mover unit is set to a cooperative control mode of each of the coil windings in the range of the feedback segment when a feedback signal detected by a displacement feedback unit of the feedback segment in the region of junction between the transition segment and the feedback segment reaches a preset feedback value.

In a third aspect, an embodiment of the present disclosure further provides a computer device, including: a memory, a processor, and a computer program stored on the memory and executable by the processor, when executing the computer program, the processor is configured to implement the method for controlling a multi-mover direct drive transmission system according to embodiments of the present disclosure.

In a fourth aspect, an embodiment of the present disclosure further provides a non-transitory storage medium, when executed by a processor, the computer program causes the processor to implement the method for controlling a multi-mover direct drive transmission system according to embodiments of the present disclosure.

Compared with the related art, in the multi-mover direct drive transmission system of the present disclosure, by arranging a stator unit and a mover unit, a magnetic field variation is produced when the mover unit moves to a magnetic field range of one of the coil windings, and one of the hall elements within the magnetic field range generates a hall signal according to a magnetic field variation detected. One of the actuators corresponding to the hall element calculates an electrical angle based on the received hall signal and calculates a drive current according to a preset initial velocity of the mover unit and the electrical angle, and one of the coil windings corresponding to the hall element drives the magnet according to the drive current to move to realize position correction. The structure does not require any expensive encoder array in the transition segment for simple transition, and can be realized by the hall element. A small number of components is used, and the structure is simple. Optionally, at the same time, the hall element is spaced from the magnet, and the hall element and the coil winding are located on a same side. The structure enables simple assembly of the hall element, the coil winding, and the magnet, so that the multi-mover direct drive transmission system, the method for controlling a multi-mover direct drive transmission system, the computer device, and the non-transitory storage medium according to the present disclosure have a simple structure, a small number of components, and a simple and easy-to-implement motion control method.

BRIEF DESCRIPTION OF DRAWINGS

In order to better illustrate the technical solutions in embodiments of the present disclosure, the accompanying drawings used in the description of the embodiments will be introduced below. It is apparent that, the accompanying drawings in the following description are only some embodiments of the present disclosure, and other drawings can be obtained by those of ordinary skill in the art from the provided drawings without creative efforts.

DESCRIPTION OF EMBODIMENTS

Figure 1:
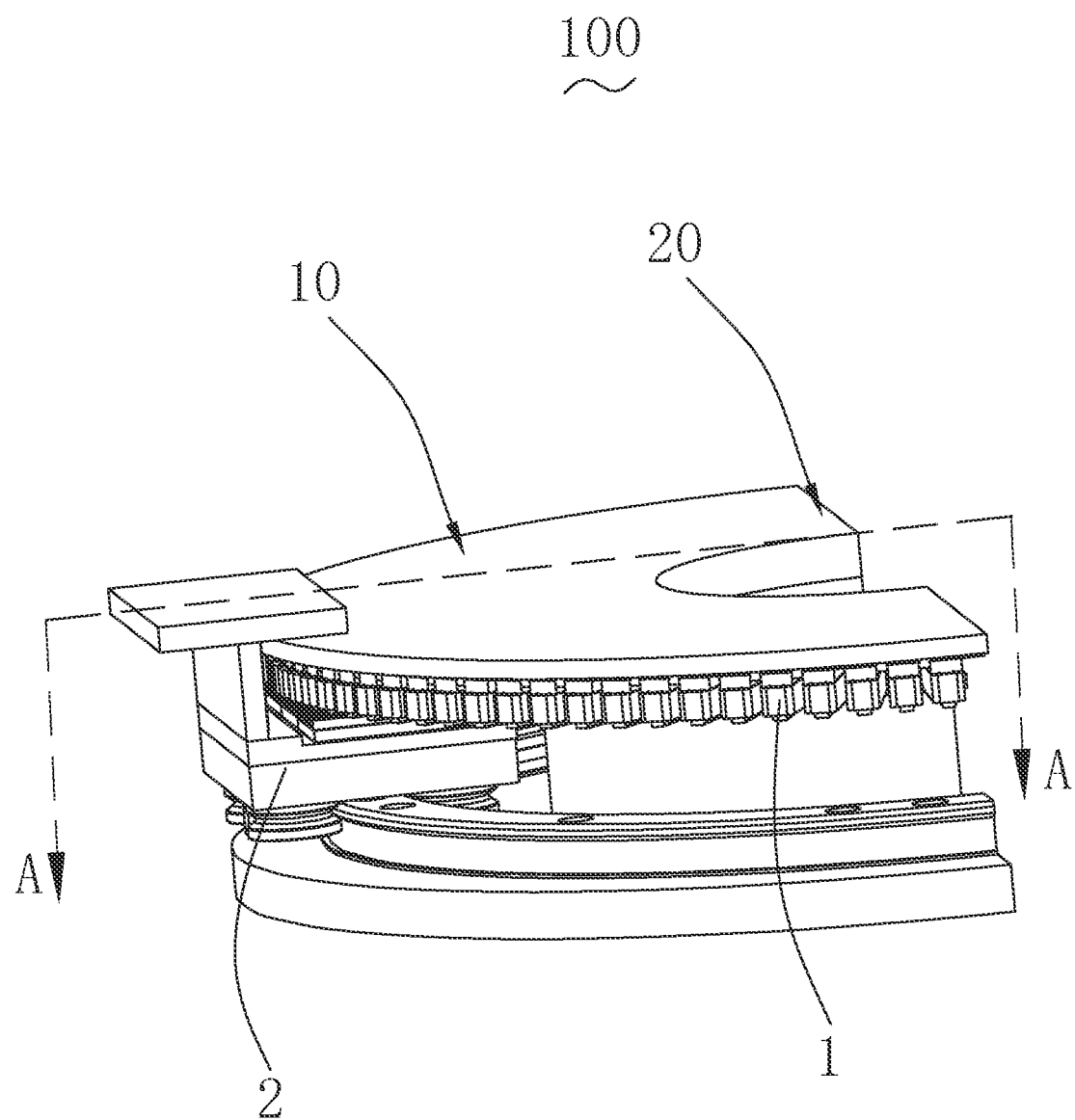
FIG. 1 is a schematic diagram of a partial three-dimensional structure of a multi-mover direct drive transmission system according to the present disclosure.
Figure 2:
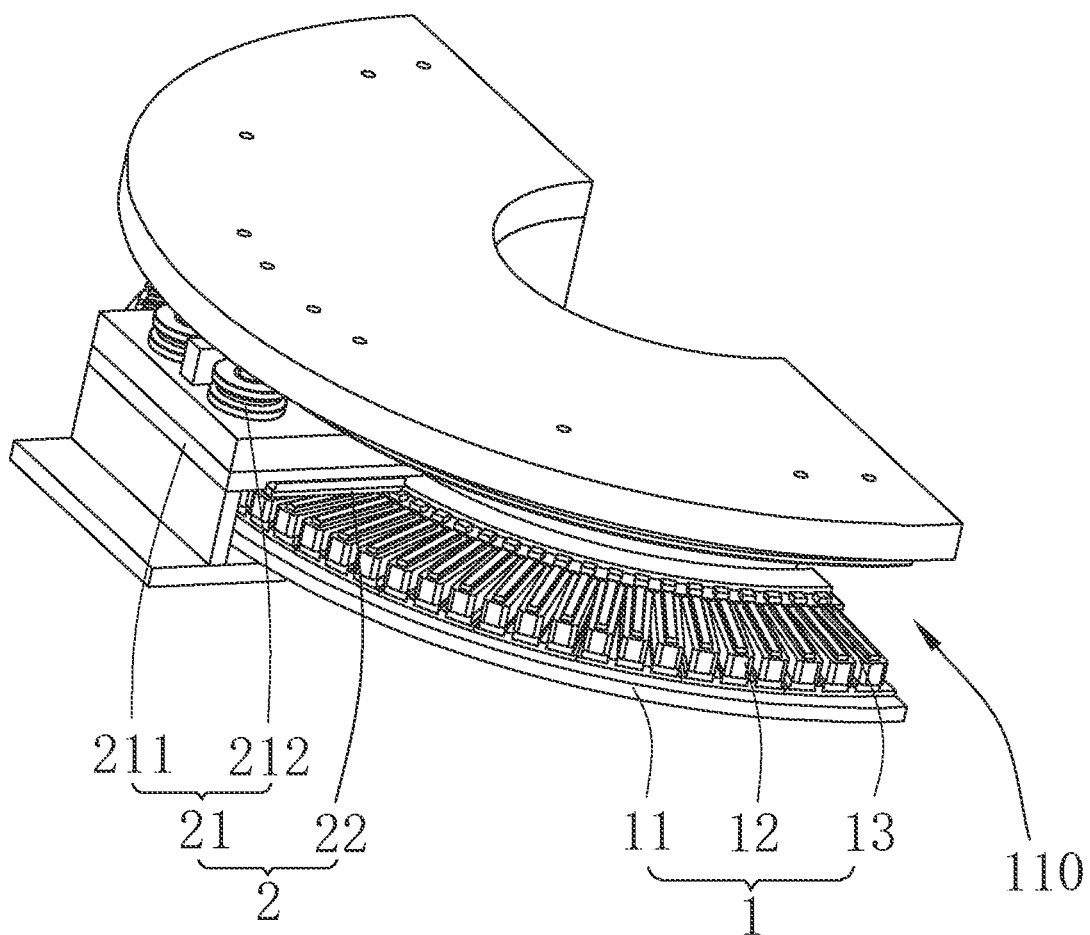
FIG. 2 is a schematic diagram of a partial three-dimensional structure of a multi-mover direct drive transmission system according to the present disclosure from another perspective.
Figure 3:
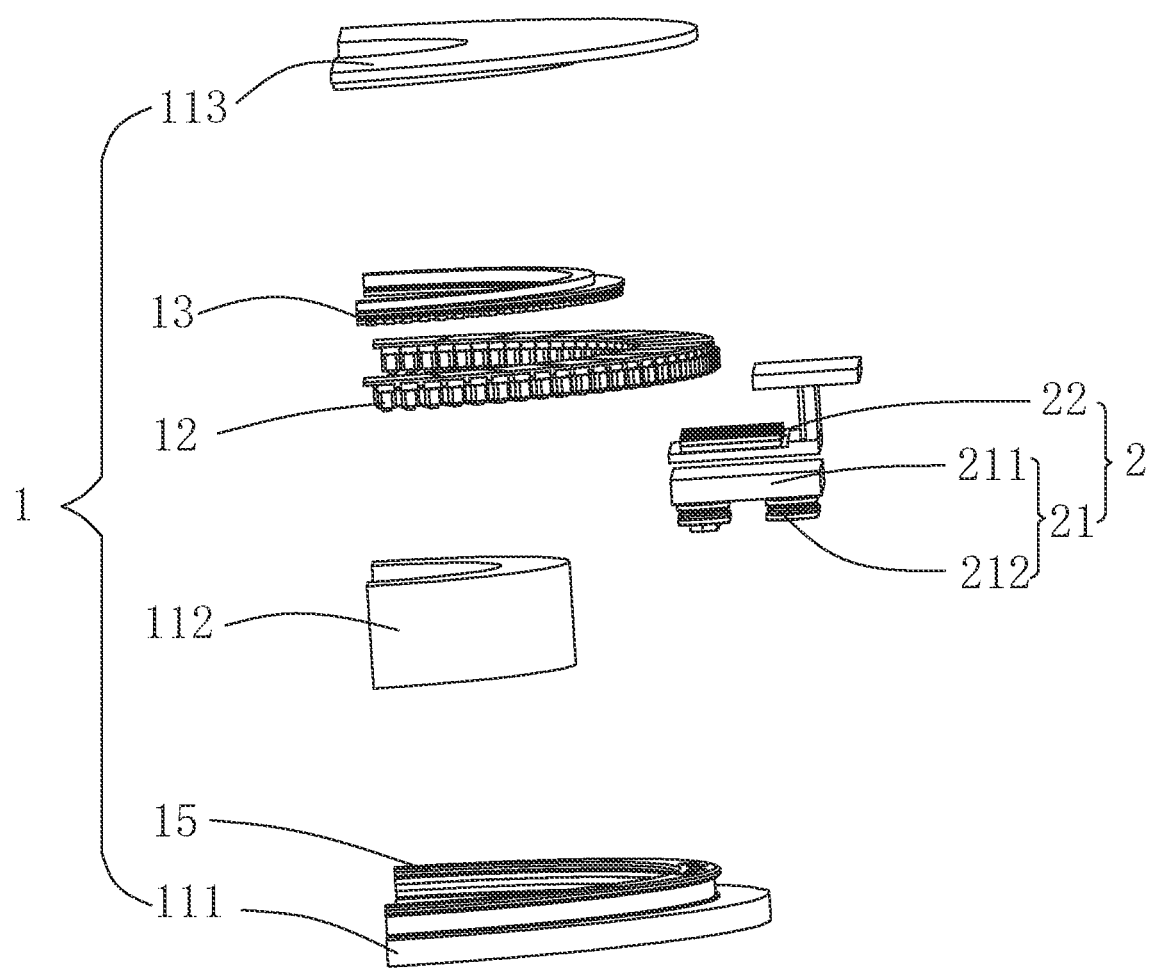
FIG. 3 is an exploded view of a partial three-dimensional structure of a multi-mover direct drive transmission system according to the present disclosure.
Figure 4:
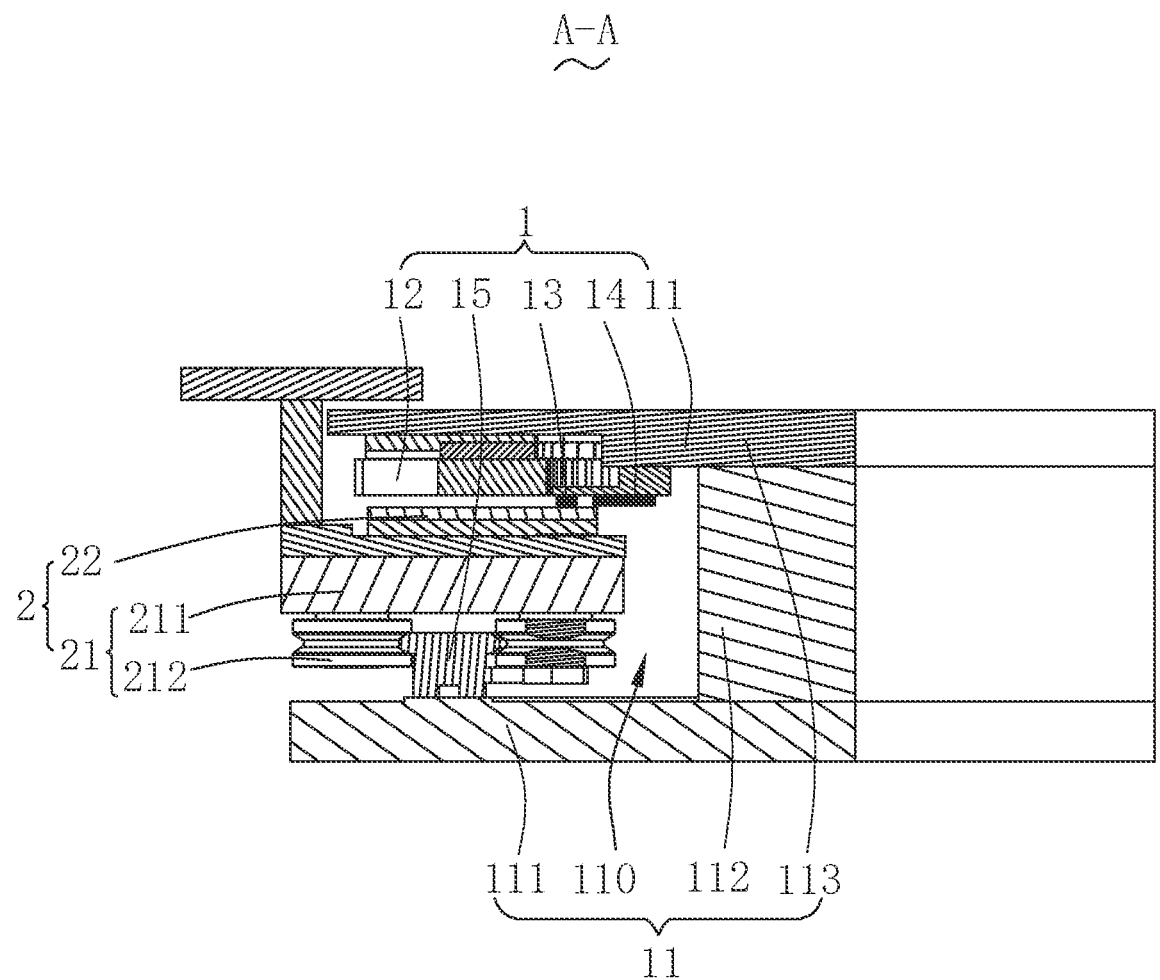
FIG. 4 is a sectional view taken along line A-A in FIG. 1.

The technical solutions in the embodiments of the present disclosure will be described below with reference to the accompanying drawings in the embodiments of the present disclosure. It is appreciated that, the described embodiments are merely some of rather than all of the embodiments of the present disclosure. All other embodiments acquired by those of ordinary skill in the art without creative efforts based on the embodiments of the present disclosure shall fall within the protection scope of the present disclosure.

An embodiment of the present disclosure provides a multi-mover direct drive transmission system 100. Refer to FIG. 1 to FIG. 5, the multi-mover direct drive transmission system 100 includes an entire stator unit 1 formed by successively connecting a plurality of stator segments, and a plurality of mover units 2 moving relative to the stator unit 1.

The stator unit 1 includes a frame 11, a plurality of coil windings 12, a hall element 13, and a mounting plate 14 of the hall element.

The frame 11 is configured to support the stator unit 1 and the mover unit 2. The frame 11 includes a first frame 111, a support 112 bending and extending from the first frame 111, and a second frame 113 bending and extending from the end of the support 112 away from the first frame 111. The first frame 111, the support 112, and the second frame 113 jointly define a receiving space 110.

Along a motion direction of the mover unit 2, the frame 11 has a ring structure and includes alternating feedback segments 20 and transition segments 10.

The coil winding 12 is configured to drive the mover unit 2 to move.

The coil winding 12 is received in the receiving space 110. The plurality of coil windings 12 are mounted on the frame 11. The plurality of coil windings 12 are arranged sequentially along an extending direction of the frame 11. The coil winding 12 is located on a side of the second frame 113 away from the support 112.

The hall element 13 is configured to generate a hall signal according to a magnetic field variation detected. The hall element 13 is received in the receiving space 110. The hall element 13 is located on a side of the second frame 113 close to the support 112. The hall element 13 and the coil winding 12 are located on a same side.

Each of the actuators corresponds to the plurality of coil windings 12. Each of the hall elements 13 is arranged corresponding to one of the coil windings 12. Each of the actuators is electrically connected to the hall element 13 and the coil winding 12.

In this embodiment, each of the actuators and the actuator adjacent thereto implement a cooperative control strategy through feedback of the hall element. The cooperative control strategy includes a master-slave cooperative control strategy. The master-slave cooperative control strategy refers to that the second actuator follows the first actuator to output a same drive current when the mover unit 2 moves to a region of junction between two adjacent stators 1.

It is to be noted that the coil winding 12 and the hall element 13 are common components and circuit modules in the art, and specific indexes and models are determined according to an actual design requirement. Details are not described herein.

Each of the mover units 2 includes a mover 21 forming a slidable connection with the stator unit 1 and movable relative to the frame 11, and a magnet 22 fixed to the mover 21. The magnet 22 is arranged directly opposite to and spaced from the coil winding 12.

The coil winding 12 drives the magnet 22 to cause the mover 2 to move.

In this embodiment, the hall element 13 are arranged in the transition segments 10 in the plurality of stator segments 1 in which only simple transition instead of positioning is required in the absence of stations. An operating process of the hall element 13 is as follows. A magnetic field variation is produced when the mover unit 2 moves to a magnetic field range of one of the coil windings 12, and one of the hall elements 13 within the magnetic field range outputs a voltage signal according to a magnetic field variation detected. The actuator corresponding to the hall element 13 calculates an electrical angle based on the received hall signal and calculates a drive current according to a preset initial velocity of the mover unit 2 and the electrical angle, and one of the coil windings 12 corresponding to the hall element 13 drives, according to the drive current to, the magnet 22 move to realize position correction. Therefore, the hall element 13 is arranged at a position where only simple transition instead of positioning is required in the absence of stations, which does not require any expensive encoder array and thus reduces the number of components compared with the related art.

Figure 6:
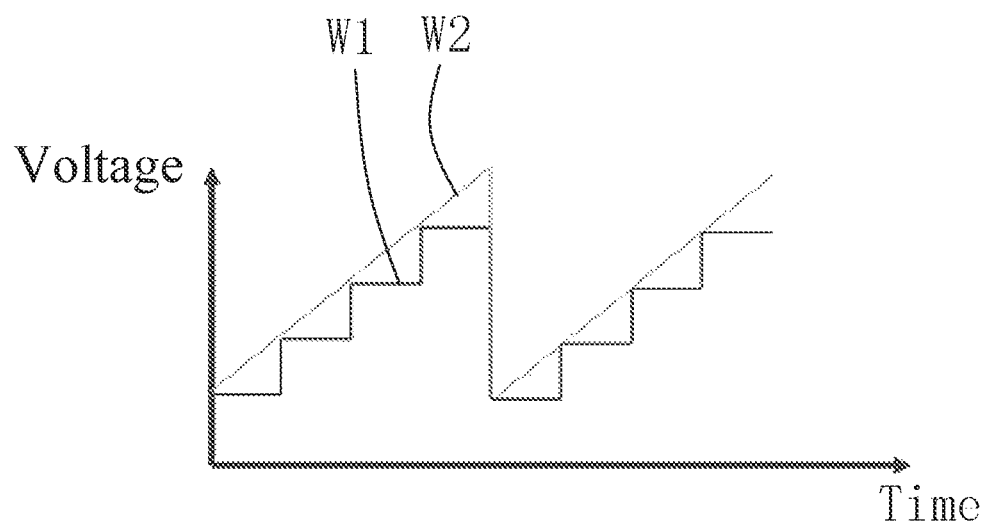
FIG. 6 is a diagram of hall signals versus electrical angles in a multi-mover direct drive transmission system according to the present disclosure.

Referring to FIG. 6, FIG. 6 is a diagram of hall signals versus electrical angles in the multi-mover direct drive transmission system 100 according to the present disclosure. In FIG. 6, W1 denotes the hall signals, W2 denotes the electrical angles. A plurality of successive hall elements 13 produce a plurality of hall signals, while the electrical angles are essentially the same. Different electrical angles produced by the different hall elements 13 may be used to fine-tune a moving velocity of the magnet 22 to realize position correction. Several roughly the same electrical angles enable the moving velocity of the magnetic steel 22 to keep smooth, so that the motion control method for the multi-mover direct drive transmission system 100 is simple and easy to implement.

In this embodiment, the hall element 13 is spaced from the magnet 22. A height between the hall element 13 and the magnet 22 is adjustable. With the structure, a mounting position of the hall element 13 may be adjusted according to an actual situation. Sensitivity of the magnetic field variation detected by the hall element 13 is set by adjusting the height between the hall element 13 and the magnet 22, so that the motion control method for the multi-mover direct drive transmission system 100 is simple and easy to implement.

In order to better enable the actuator to drive the magnet 22 through the coil winding 12 to achieve the purpose of correcting the position of the magnet 22, in this embodiment, two electrical angles calculated by two adjacent actuators are compared with a preset electrical angle, and a cooperative control strategy is adopted according to a comparison result to drive the magnet 22 to move. The cooperative control strategy is a master-slave cooperative control strategy with the same drive current in the two adjacent actuators. Compared with the master control mode in which each of the actuators performs driving separately, the arrangement is simple and easy to operate and does not require complex logic control, thereby making the control logic of the actuator simple, so that the motion control method for the multi-mover direct drive transmission system 100 is simple and easy to implement.

The mover 21 is partially received in the receiving space 110. The mover 21 is connected to the second frame 113 and forms a slidable connection with the second frame 113.

To better enable the mover 21 to move and form a slidable connection with the second frame 113, in this embodiment, the multi-mover direct drive transmission system 100 further includes a track 15 fixed to the first frame 111. The track 15 is received in the receiving space 110. An extending direction of the track 15 is the same as the first frame 111. The mover 2 further includes a mover body 211 and a pulley 212 fixed to the mover body 211. The pulley 212 and the magnet 22 are located on two opposite sides of the mover body 211, respectively. The pulley 212 matches the track 15 and forms a slidable connection with the track 15. The structure of the pulley 212 and the track 15 enables the mover 2 to move stably and smoothly.

Figure 5:
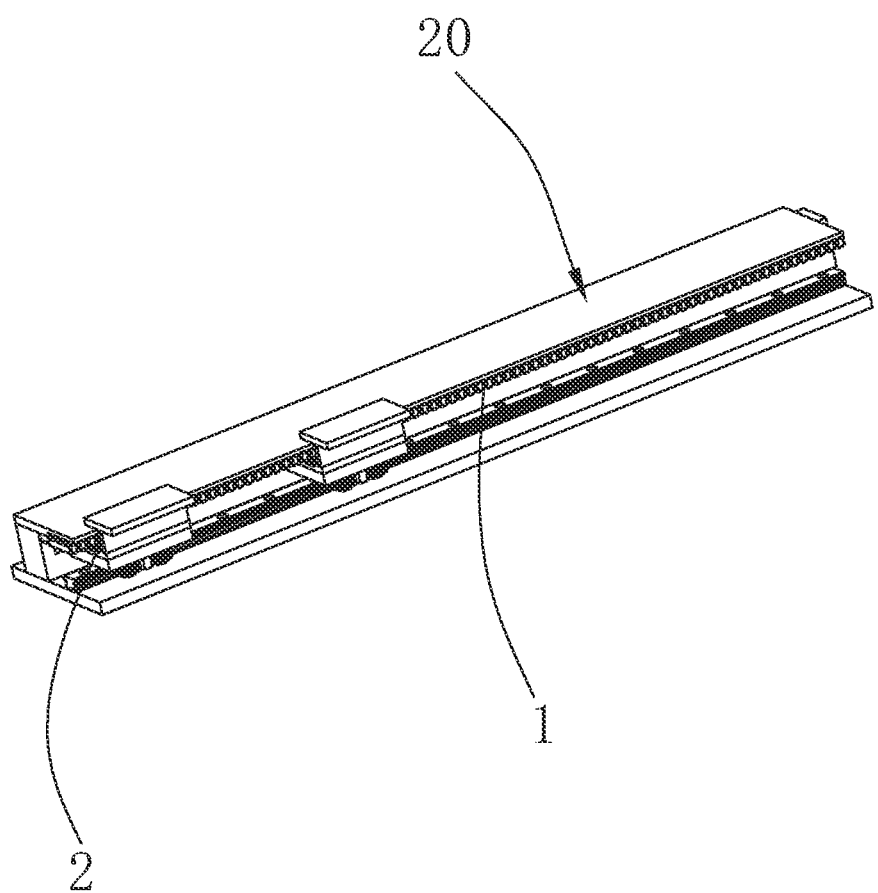
FIG. 5 is a schematic diagram of another partial three-dimensional structure of a multi-mover direct drive transmission system according to the present disclosure.

Referring to FIG. 5, the stator unit 1 further includes a plurality of displacement sensors (not shown) mounted on the feedback segments 20.

The displacement feedback units (displacement sensors) are located on the feedback segments 20. The displacement feedback units are configured to accurately control positions of the movers 21. The displacement feedback units are in one-to-one correspondence to the coil windings 12 connected thereto. That is, each of the displacement feedback units is arranged corresponding to one of the coil windings 12.

The displacement feedback unit and the hall element 13 are used at the same time so that accurate adjustment can be implemented when the position of the mover 2 is required to be accurately controlled. Simple transition in the transition segment 10 requires no expensive encoder array is achieved using the hall element 13. With the structure, the motion control method for the multi-mover direct drive transmission system 100 is simple and easy to implement.

Figure 7:
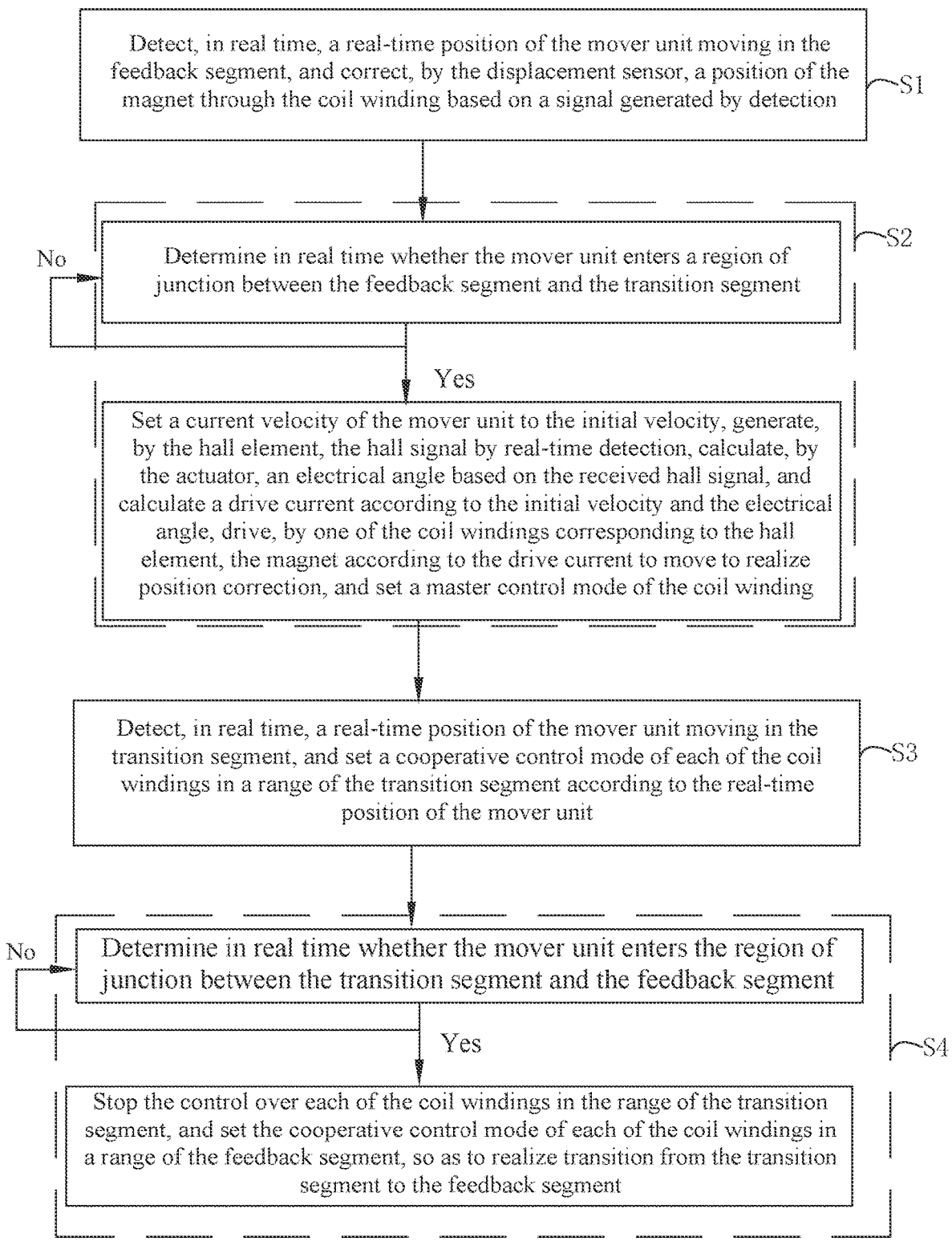
FIG. 7 is a flow block diagram of a method for controlling a multi-mover direct drive transmission system according to the present disclosure.

The present disclosure further provides a method for controlling a multi-mover direct drive transmission system. Referring to FIG. 7, the method for controlling a multi-mover direct drive transmission system is applied to the multi-mover direct drive transmission system 100 as described in the above embodiments.

The method for controlling a multi-mover direct drive transmission system includes the following steps.

In step S1, the displacement sensor detects, in real time, a real-time position of the mover unit 2 moving in the feedback segment 20.

In step S2, it is determined in real time whether the mover unit 2 enters a region of junction between the feedback segment 20 and the transition segment 10: if yes, a current velocity of the mover unit 2 is set to the initial velocity, the hall element 13 generates the hall signal by real-time detection, the actuator calculates an electrical angle based on the received hall signal, and calculates a drive current according to the initial velocity and the electrical angle, one of the coil windings 12 corresponding to the hall element 13 drives the magnet 22 according to the drive current to move to realize position correction, and a master control mode of the coil winding 12 is set.

In this embodiment, along the motion direction of the mover unit 2, it is determined that the mover unit 2 enters the region of junction between the feedback segment 20 and the transition segment 10 when the final displacement feedback unit in the feedback segment 20 detects that the mover unit 2 reaches a preset first transition velocity. In step S2, the electrical angle is corrected in real time according to the preset first transition velocity through the hall element 13 to realize operational control, so that the motion control method is simple and easy to implement.

In step S3, a real-time position of the mover unit 2 moving in the transition segment 10 is detected in real time, and a cooperative control mode of each of the coil windings 12 in a range of the transition segment 10 according to the real-time position of the mover unit 2 is set. The cooperative control mode is either of a master control mode and switch of a master-slave control mode.

Figure 8:
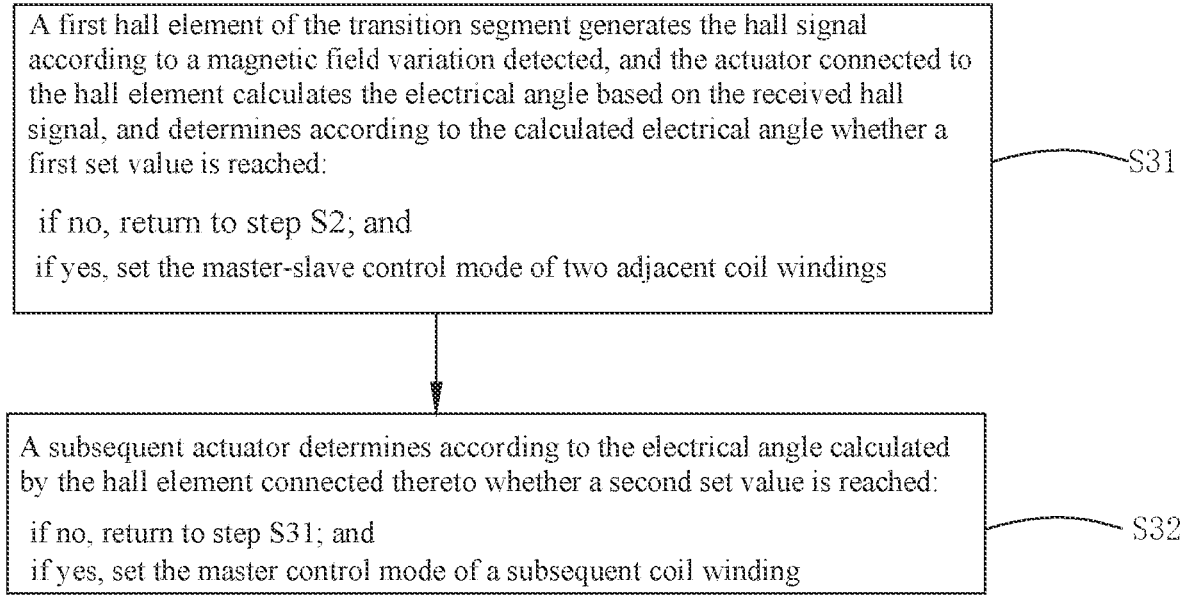
FIG. 8 is a flow block diagram of step S3 in a method for controlling a multi-mover direct drive transmission system according to the present disclosure.

Referring to FIG. 8, in step S3, in a region of junction between two adjacent stator units 1 in the transition segment 10, the setting the cooperative control mode includes the following steps.

In step S31, a first hall element 13 of the transition segment 10 generates the hall signal according to a magnetic field variation detected, and the actuator connected to the hall element 13 calculates the electrical angle based on the received hall signal, and determines according to the calculated electrical angle whether a first set value is reached: if no, step S2 is performed; and if yes, the master-slave control mode of two adjacent coil windings 12 is set.

In step S32, a subsequent actuator determines, according to the electrical angle calculated by the hall element 13 connected thereto, whether a second set value is reached: if no, step S31 is performed; and if yes, the master control mode of a subsequent coil winding 12 is set. Through step S31 to step S32, it is determined through the electrical angle whether the first set value and the second set value are reached, so as to achieve operational control and achieve smooth transition.

In step S3, according to the calculated electrical angle information, the actuator adopts the cooperative control strategy during the transition between the different stators 1, and the master-slave cooperative control strategy is preferred, so that the motion control method is simple and easy to implement.

In step S4, it is determined in real time whether the mover unit 2 enters the region of junction between the transition segment 10 and the feedback segment 20; if yes, the control over each of the coil windings 12 in the range of the transition segment 10 is stopped, and the cooperative control mode of each of the coil windings 12 in a range of the feedback segment 20 is set, so as to realize transition from the transition segment 10 to the feedback segment 20.

In step S4, along a motion direction of the mover unit 2, the control over the mover unit 2 is set to a cooperative control mode of each of the coil windings 12 in the range of the feedback segment 20 when a feedback signal detected by the displacement feedback unit of the feedback segment 20 in the region of junction between the transition segment 10 and the feedback segment 20 reaches a preset feedback value.

By implementing the above steps, the method for controlling a multi-mover direct drive transmission system requires a small number of components, and the motion control method is simple and easy to implement.

Figure 9:
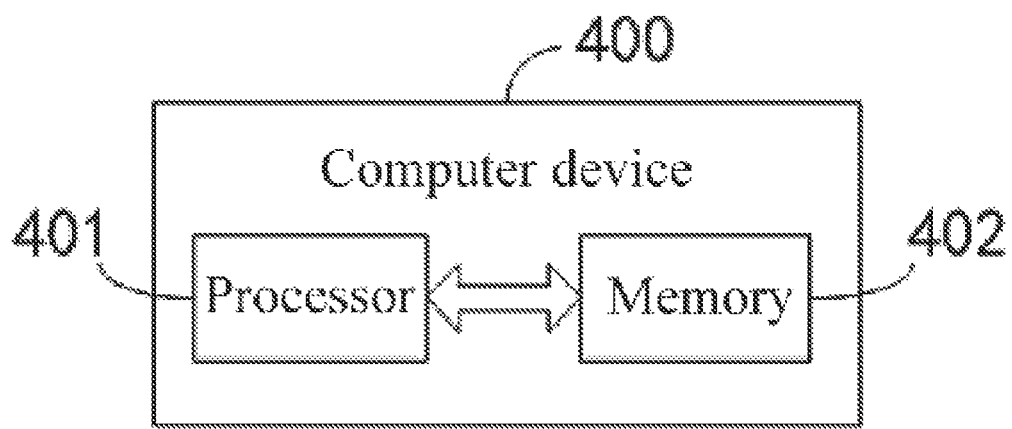
FIG. 9 is a schematic structural diagram of a computer device according to an embodiment of the present disclosure.

An embodiment of the present disclosure further provides a computer device. Refer to FIG. 9 which is a schematic structural diagram of a computer device according to an embodiment of the present disclosure. The computer device 400 includes: a memory 402, a processor 401, and a computer program stored on the memory 402 and executable by the processor 401.

The processor 401 performs the computer program stored in the memory 402 to implement steps in the method for controlling a multi-mover direct drive transmission system in the above embodiments.

The computer device 400 according to embodiments of the present disclosure can implement the steps in the method for controlling a multi-mover direct drive transmission system in the above embodiments, and can achieve the same technical effect, please refer to the description in the above embodiment. Details are not described herein.

An embodiment of the present disclosure further provides a non-transitory storage medium. The non-transitory storage medium stores a computer program. The computer program, when executed by a processor, causes the processor to implement various processes and steps in the method for controlling a multi-mover direct drive transmission system according to embodiments of the present disclosure, and can achieve the same technical effect. Details are not described herein so as to avoid repetition.

Those of ordinary skill in the art may understand that some or all procedures in the methods in the foregoing embodiments may be implemented by a computer program instructing related hardware, the program may be stored in a non-transitory storage medium, and when the program is executed, the procedures in the foregoing method embodiments may be implemented. The storage medium may be a magnetic disk, an optical disk, a Read-Only Memory (ROM), a Random Access Memory (RAM), or the like.

It is to be noted that the terms such as "comprise", "include" or other variations thereof are intended to cover a non-exclusive inclusion, for example, processes, methods, items or apparatuses including a series of elements are not limited to these elements listed explicitly, but rather include other elements not listed explicitly, or other elements inherent to these processes, methods, items or apparatuses. In the absence of further limitations, elements defined by the statement "include a/an . . . " do not preclude the existence of additional identical elements in the processes, methods, items or apparatuses including the elements.

Through the descriptions of the above embodiments, it is clear to those skilled in the art that the present disclosure may be implemented by software and a necessary universal hardware platform or by hardware, but in many cases the former is preferred. Based on such understanding, the technical solutions in the present disclosure essentially, or the part contributing to the related art may be implemented in a form of a software product. The computer software product is stored in a storage medium (e.g., an ROM/RAM, a magnetic disk, or an optical disk), and includes several instructions for instructing a terminal (which may be a mobile phone, a computer, a server, an air conditioner, a network device, or the like) to perform the methods described in the embodiments of the present disclosure.

Compared with the related art, in the multi-mover direct drive transmission system of the present disclosure, by arranging a stator unit and a mover unit, a magnetic field variation is produced when the mover unit moves to a magnetic field range of one of the coil windings, and one of the hall elements within the magnetic field range generates a hall signal according to a magnetic field variation detected. One of the actuators corresponding to the hall element calculates an electrical angle based on the received hall signal and calculates a drive current according to a preset initial velocity of the mover unit and the electrical angle, and one of the coil windings corresponding to the hall element drives the magnet according to the drive current to move to realize position correction. The structure does not require an expensive encoder array in the transition segment for simple transition, and can be realized by the hall element. A small number of components is used, and the structure is simple. Optionally, at the same time, the hall element is spaced from the magnet, and the hall element and the coil winding are located on a same side. The structure enables simple assembly of the hall element, the coil winding, and the magnet, so that the multi-mover direct drive transmission system, the method for controlling a multi-mover direct drive transmission system, the computer device, and the non-transitory storage medium according to the present disclosure are featured with a simple structure, a small number of components, and a simple and easy-to-implement motion control method.

The above are only embodiments of the present disclosure. It should be pointed out herein that those of ordinary skill in the art may further make improvements without departing from the inventive concept of the present disclosure. The improvements all fall within the protection scope of the present disclosure.

What is claimed is:

1. A multi-mover direct drive transmission system, comprising:
   a stator unit formed by stator segments successively connected to each other, wherein the stator unit comprises a frame and coil windings mounted on the frame and arranged sequentially along an extending direction of the frame;
   mover units movable relative to the stator unit, wherein each of the mover units comprises a mover slidably connected to the stator unit and movable relative to the frame, and a magnet fixed to the mover; and
   actuators,
   wherein the magnet is arranged directly opposite to and spaced from the coil winding, and the coil winding drives the magnet to cause the mover to move,
   wherein the frame comprises alternatingly arranged feedback segments and transition segments,
   wherein the stator unit further comprises hall elements mounted on the transition segments and fixed at intervals to the frame, each of the actuators corresponds to multiple ones of the coil windings, each of the hall elements is arranged corresponding to one of the coil windings, and each of the actuators is electrically connected to the hall element and the coil winding; the hall element is spaced from the magnet; the hall element and the coil winding are located on a same side; and
   wherein a magnetic field variation is produced when the mover unit moves to a magnetic field range of one of the coil windings, and one of the hall elements within the magnetic field range outputs a hall signal according to a magnetic field variation detected; the actuator corresponding to the hall element calculates an electrical angle based on the received hall signal and calculates a drive current according to a preset initial velocity of the mover unit and the electrical angle, and one of the coil windings corresponding to the hall element drives the magnet according to the drive current to move to realize position correction.

2. The multi-mover direct drive transmission system as described in claim 1, wherein a height between the hall element and the magnet is adjustable.

3. The multi-mover direct drive transmission system as described in claim 1, wherein the frame comprises a first frame, a support bending and extending from the first frame, and a second frame bending and extending from an end of the support away from the first frame; the first frame, the support, and the second frame jointly define a receiving space, the hall element and the coil winding are received in the receiving space, the hall element is located on a side of the second frame close to the support, and the coil winding is located on a side of the second frame away from the support; and the mover is partially received in the receiving space, and the mover is connected to the second frame and slidably connected to the second frame.

4. The multi-mover direct drive transmission system as described in claim 3, wherein the stator unit further comprises a track fixed to the first frame, the track being received in the receiving space; and the mover further comprises a mover body and a pulley fixed to the mover body, the pulley and the magnet are located at two opposite sides of the mover body respectively, and the pulley matches the track and is slidably connected to the track.

5. A method for controlling a multi-mover direct drive transmission system, applied to a multi-mover direct drive transmission system, the multi-mover direct drive transmission system comprises:
   a stator unit formed by stator segments successively connected to each other, wherein the stator unit comprises a frame and coil windings mounted on the frame and arranged sequentially along an extending direction of the frame;

mover units movable relative to the stator unit, wherein each of the mover units comprises a mover slidably connected to the stator unit and movable relative to the frame, and a magnet fixed to the mover; and actuators, wherein the magnet is arranged directly opposite to and spaced from the coil winding, and the coil winding drives the magnet to cause the mover to move, wherein the frame comprises alternatingly arranged feedback segments and transition segments, wherein the stator unit further comprises hall elements mounted on the transition segments and fixed at intervals to the frame, each of the actuators corresponds to multiple ones of the coil windings, each of the hall elements is arranged corresponding to one of the coil windings, and each of the actuators is electrically connected to the hall element and the coil winding; the hall element is spaced from the magnet; the hall element and the coil winding are located on a same side; and wherein a magnetic field variation is produced when the mover unit moves to a magnetic field range of one of the coil windings, and one of the hall elements within the magnetic field range outputs a hall signal according to a magnetic field variation detected; the actuator corresponding to the hall element calculates an electrical angle based on the received hall signal and calculates a drive current according to a preset initial velocity of the mover unit and the electrical angle, and one of the coil windings corresponding to the hall element drives the magnet according to the drive current to move to realize position correction, wherein the stator unit further comprises displacement sensors mounted on the feedback segments, and each of the displacement sensors is arranged corresponding to one of the stator units;

wherein the method comprises:

S1: detecting, in real time by the displacement sensor, a real-time position of the mover unit moving in the feedback segment;

S2: determining, in real time according to a feedback position of the displacement sensor of the feedback segment, whether the mover unit enters a region of junction between the feedback segment and the transition segment; if yes, setting a current velocity of the mover unit as the initial velocity, generating, by the hall element, the hall signal by real-time detection, calculating, by the actuator, the electrical angle based on the received hall signal, and calculating a drive current according to the initial velocity and the electrical angle, driving, by one of the coil windings corresponding to the hall element, the magnet according to the drive current to move to realize position correction, and setting a master control mode of the coil winding;

S3: detecting, in real time, a real-time position of the mover unit moving in the transition segment, and setting a cooperative control mode of each of the coil windings in a range of the transition segment according to the real-time position of the mover unit; wherein the cooperative control mode is either of a master control mode and switch of a master-slave control mode; and S4: determining in real time whether the mover unit enters the region of junction between the transition segment and the feedback segment; if yes, stopping the control over each of the coil windings in the range of the transition segment, and setting the cooperative control mode of each of the coil windings in a range of the feedback segment, so as to realize transition from the transition segment to the feedback segment.

6. The method for controlling a multi-mover direct drive transmission system as described in claim 5, wherein, in S3, in a region of junction between two adjacent stator units in the transition segment, the setting the cooperative control mode comprises:

S31: generating, by a first hall element of the transition segment, the hall signal according to a magnetic field variation detected, calculating, by the actuator, the electrical angle based on the received hall signal, and determining according to the calculated electrical angle whether a first set value is reached, if no, returning to S2; and if yes, setting the master-slave control mode of two adjacent coil windings; and S32: determining, by a subsequent actuator according to the electrical angle calculated by the hall element connected thereto, whether a second set value is reached, if no, returning to S31; and if yes, setting the master control mode of a subsequent coil winding.

7. The method for controlling a multi-mover direct drive transmission system as described in claim 5, wherein, in step S4, along a motion direction of the mover unit, the control over the mover unit is set to a cooperative control mode of each of the coil windings in the range of the feedback segment when a feedback signal detected by a displacement feedback unit of the feedback segment in the region of junction between the transition segment and the feedback segment reaches a preset feedback value.

8. A non-transitory storage medium, wherein when executed by a processor, the computer program causes the processor to:

S1: detecting, in real time by the displacement sensor, a real-time position of the mover unit moving in the feedback segment;

S2: determining, in real time according to a feedback position of the displacement sensor of the feedback segment, whether the mover unit enters a region of junction between the feedback segment and the transition segment; if yes, setting a current velocity of the mover unit as the initial velocity, generating, by the hall element, the hall signal by real-time detection, calculating, by the actuator, the electrical angle based on the received hall signal, and calculating a drive current according to the initial velocity and the electrical angle, driving, by one of the coil windings corresponding to the hall element, the magnet according to the drive current to move to realize position correction, and setting a master control mode of the coil winding;

S3: detecting, in real time, a real-time position of the mover unit moving in the transition segment, and setting a cooperative control mode of each of the coil windings in a range of the transition segment according to the real-time position of the mover unit; wherein the cooperative control mode is either of a master control mode and switch of a master-slave control mode; and S4: determining in real time whether the mover unit enters the region of junction between the transition segment and the feedback segment; if yes, stopping the control over each of the coil windings in the range of the transition segment, and setting the cooperative control mode of each of the coil windings in a range of the feedback segment, so as to realize transition from the transition segment to the feedback segment.

* * * * *